United States Patent
Zhu et al.

(10) Patent No.: US 10,956,934 B2
(45) Date of Patent: Mar. 23, 2021

(54) METHOD, SYSTEM, AND CLIENT FOR PUBLISHING ADVERTISEMENT ON NETWORK SERVICE PLATFORM

(71) Applicant: TENCENT TECHNOLOGY (SHENZHEN) COMPANY LIMITED, Shenzhen (CN)

(72) Inventors: Longyun Zhu, Shenzhen (CN); Shenglong Ling, Shenzhen (CN); Bo Xu, Shenzhen (CN); Changyue Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1167 days.

(21) Appl. No.: 14/718,198

(22) Filed: May 21, 2015

(65) Prior Publication Data
US 2015/0254715 A1    Sep. 10, 2015

Related U.S. Application Data

(63) Continuation of application No. PCT/CN2013/086533, filed on Nov. 5, 2013.

(30) Foreign Application Priority Data

Nov. 26, 2012   (CN) .......................... 201210486492.0

(51) Int. Cl.
*G06Q 30/02*   (2012.01)
*H04W 4/21*    (2018.01)

(52) U.S. Cl.
CPC ..... *G06Q 30/0256* (2013.01); *G06Q 30/0241* (2013.01); *H04W 4/21* (2018.02)

(58) Field of Classification Search
CPC ........................... G06Q 30/0256; H04W 4/21
See application file for complete search history.

(56) References Cited

U.S. PATENT DOCUMENTS

| | | | | |
|---|---|---|---|---|
| 5,799,284 A | * | 8/1998 | Bourquin | G06Q 30/0256 705/14.54 |
| 7,428,750 B1 | * | 9/2008 | Dunn | G06F 21/41 726/8 |
| 8,955,080 B2 | * | 2/2015 | Brunswig | G06F 21/41 713/158 |

(Continued)

FOREIGN PATENT DOCUMENTS

| CN | 1469583 A | * | 1/2004 | ............... H04L 9/32 |
|---|---|---|---|---|
| CN | 101384014 A | | 3/2009 | |

(Continued)

OTHER PUBLICATIONS

Search Report in International Application No. PCT/CN2013/086533 dated Feb. 20, 2014.

(Continued)

*Primary Examiner* — David J Stoltenberg
(74) *Attorney, Agent, or Firm* — Brinks Gilson & Lione

(57) ABSTRACT

Options are displayed on a user interface that provides a network service, a selection instruction of a user is received, and an option selected by the user is acquired according to the selection instruction; the option selected by the user is recorded; and an advertisement that matches the option is queried for, and the advertisement is presented to the user.

13 Claims, 6 Drawing Sheets

(56) References Cited

U.S. PATENT DOCUMENTS

| | | | |
|---|---|---|---|
| 9,032,328 B1* | 5/2015 | Kilat | G06F 8/315 |
| | | | 715/789 |
| 2003/0004897 A1* | 1/2003 | Smith, IV | G06Q 20/3821 |
| | | | 705/76 |
| 2005/0044423 A1* | 2/2005 | Mellmer | G06F 21/31 |
| | | | 726/4 |
| 2006/0041632 A1 | 2/2006 | Shah et al. | |
| 2007/0156527 A1* | 7/2007 | Rubinstein | G06Q 30/0242 |
| | | | 705/14.41 |
| 2008/0014931 A1* | 1/2008 | Yared | G06F 21/41 |
| | | | 455/432.3 |
| 2008/0148193 A1* | 6/2008 | Moetteli | G06F 16/954 |
| | | | 715/854 |
| 2008/0172372 A1* | 7/2008 | Shacham | G06F 16/958 |
| 2008/0172373 A1* | 7/2008 | Jenson | G06F 16/955 |
| 2008/0183573 A1* | 7/2008 | Muschetto | G06Q 30/0242 |
| | | | 705/14.41 |
| 2008/0229352 A1* | 9/2008 | Pino | H04L 67/22 |
| | | | 725/22 |
| 2009/0106433 A1* | 4/2009 | Knouse | H04L 63/0815 |
| | | | 709/229 |
| 2009/0119013 A1* | 5/2009 | O'Malley | G06Q 20/20 |
| | | | 701/431 |
| 2009/0144131 A1* | 6/2009 | Chiu | G06Q 30/02 |
| | | | 704/270 |
| 2009/0222551 A1* | 9/2009 | Neely | G06F 16/951 |
| | | | 709/224 |
| 2010/0024015 A1* | 1/2010 | Hardt | H04L 67/14 |
| | | | 726/6 |
| 2010/0024022 A1* | 1/2010 | Wells | H04L 63/0838 |
| | | | 726/7 |
| 2010/0211464 A1 | 8/2010 | Zhu et al. | |
| 2010/0268584 A1* | 10/2010 | Pullur | G06Q 30/0241 |
| | | | 705/14.16 |
| 2011/0004596 A1* | 1/2011 | Gildred | H04N 1/00453 |
| | | | 707/740 |
| 2011/0184804 A1* | 7/2011 | Sontag | G06F 21/335 |
| | | | 705/14.49 |
| 2011/0208778 A1* | 8/2011 | Mellmer | G06F 21/31 |
| | | | 707/783 |
| 2011/0231240 A1* | 9/2011 | Schoen | G06Q 30/0242 |
| | | | 705/14.41 |
| 2011/0295944 A1* | 12/2011 | Buonomo | G06F 8/61 |
| | | | 709/203 |
| 2012/0151359 A1* | 6/2012 | Mysen | G06F 11/3438 |
| | | | 715/736 |
| 2012/0158514 A1* | 6/2012 | Aldrey | G06Q 30/0269 |
| | | | 705/14.66 |
| 2012/0227098 A1* | 9/2012 | Obasanjo | H04L 63/0815 |
| | | | 726/8 |
| 2013/0036459 A1* | 2/2013 | Liberman | H04L 9/0866 |
| | | | 726/6 |
| 2013/0060636 A1* | 3/2013 | Walker | H04M 1/72586 |
| | | | 705/14.58 |
| 2013/0073388 A1* | 3/2013 | Heath | G06Q 30/02 |
| | | | 705/14.53 |
| 2013/0133056 A1* | 5/2013 | Taylor | G06Q 20/384 |
| | | | 726/8 |
| 2013/0297425 A1* | 11/2013 | Wallaja | G06Q 20/322 |
| | | | 705/14.64 |
| 2014/0025766 A1* | 1/2014 | Beck | G06Q 10/107 |
| | | | 709/206 |
| 2014/0025949 A1* | 1/2014 | Kay | G06F 21/44 |
| | | | 713/168 |
| 2015/0026149 A1* | 1/2015 | Jones | G06Q 30/0224 |
| | | | 707/706 |
| 2015/0195598 A1* | 7/2015 | Chang | H04N 21/454 |
| | | | 725/34 |
| 2015/0294349 A1* | 10/2015 | Capel | G06Q 30/0267 |
| | | | 705/14.43 |
| 2016/0006721 A1* | 1/2016 | Patel | G06Q 50/01 |
| | | | 726/8 |
| 2016/0359987 A1* | 12/2016 | Laliberte | H04W 4/14 |
| 2017/0345105 A1* | 11/2017 | Isaacson | H04W 12/0609 |

FOREIGN PATENT DOCUMENTS

| | | |
|---|---|---|
| CN | 101431524 A | 5/2009 |
| CN | 101667281 A | 3/2010 |
| CN | 101685521 A | 3/2010 |
| CN | 102314422 A | 1/2012 |
| CN | 102614422 A | 8/2012 |

OTHER PUBLICATIONS

Office Action in CN Application No. 201210486492.0 dated Jul. 10, 2017, 12 pages.

International Preliminary Report on Patentability and Written Opinion in International Application No. PCT/CN2013/086533 dated Jun. 4, 2015, 21 pages.

Office Action in CN Application No. 201210486492.0 dated Mar. 27, 2018, 14 pages.

* cited by examiner

METHOD, SYSTEM, AND CLIENT FOR PUBLISHING ADVERTISEMENT ON NETWORK SERVICE PLATFORM

RELATED APPLICATION

This application claims priority to Chinese Patent Application No. 201210486492.0, filed with the Chinese Patent Office on Nov. 26, 2012 and entitled "METHOD, SYSTEM, AND CLIENT FOR PUBLISHING NETWORK MEDIA INFORMATION", which is incorporated herein by reference in its entirety.

FIELD OF THE TECHNOLOGY

The present disclosure relates to a method, system, and client for publishing an advertisement on a network service platform.

BACKGROUND OF THE DISCLOSURE

To effectively present high matching advertisement information (also referred to as network media information) to a specific audience, an existing publishing system generally performs data processing such as collection, data mining, analysis, induction, and statistics collection on user Internet surfing records, and performs computing to obtain attribute information of each user that includes a user attribute and/or a socializing attribute. The user attribute may be, for example, an attribute such as an age group, interest, education background, or a region of a user, and the socializing attribute may be, for example, a type of a friend circle of a user such as an industry, a graduation school, or an interest circle. An advertisement information advertiser may perform targeted advertising according to user attribute information and other information that is set, for example, an advertising region, an industry (for example, the IT industry, the mechanical manufacturing industry, or the chemical engineering industry), and an interest type (for example, the film type, the music type, the football type, or the tennis type).

SUMMARY

In view of this, a major objective of the present disclosure is to provide a method, system, and client for publishing advertisement information on a network service platform to implement targeted advertisement information advertising.

A method for publishing an advertisement on a network service platform in an embodiment of the present invention includes:

displaying options on a user interface that provides a network service, receiving a selection instruction of a user, and acquiring, according to the selection instruction, an option selected by the user;

recording the option selected by the user; and querying for an advertisement that matches the option, and presenting the advertisement to the user.

A system for publishing an advertisement on a network service platform in an embodiment of the present invention includes:

a control module, configured to display options on a user interface that provides a network service, receive a selection instruction of a user, and acquire, according to the selection instruction, an option selected by the user;

an association server, configured to record the option selected by the user; and a network service module, configured to query for an advertisement that matches the option, and present the advertisement to the user.

A client for publishing an advertisement on a network service platform in an embodiment of the present invention includes:

a control module, configured to display options on a user interface that provides a network service, receive a selection instruction of a user, acquire, according to the selection instruction, an option selected by the user, and submit the option to an association server for recording; and a network service module, configured to query a server for an advertisement that matches the option, and present the advertisement to the user.

In the present disclosure, a user voluntarily selects a to-be-followed option, that is, advertisement type information, and advertising becomes more targeted. In addition, because massive user Internet surfing records do not need to analyzed, a large number of computing resources and storage resources do not need to be occupied, less software and hardware devices are required, an implementation cost is low, and invasion of user privacy information can also be avoided.

BRIEF DESCRIPTION OF THE DRAWINGS

The following accompanying drawings merely show some examples of the technical solutions of the present disclosure, and the present disclosure is not limited to characteristics shown in the drawings. Similar numerals in the following accompanying drawings represent similar elements.

DESCRIPTION OF EMBODIMENTS

For the purpose of a brief and intuitive description, the solutions of the present disclosure are explained below by describing some representative embodiments. Many details in the embodiments are merely for the purpose of helping to understand the solutions of the present disclosure. However, apparently, the technical solutions of the present disclosure may not be limited to these details during implementation.

To avoid that the solutions of the present disclosure are unnecessarily obscured, some implementation manners are not described in detail, and only frameworks are provided. In the following, "include" refers to "include, but is not limited to", and "according to . . . " refers to "at least according to . . . ", but is not limited to "only according to". Because of language habits of Chinese, when the number of elements is not particularly pointed out below, it means that there may be one or more elements, or it may be understood as at least one element.

Figure 1:
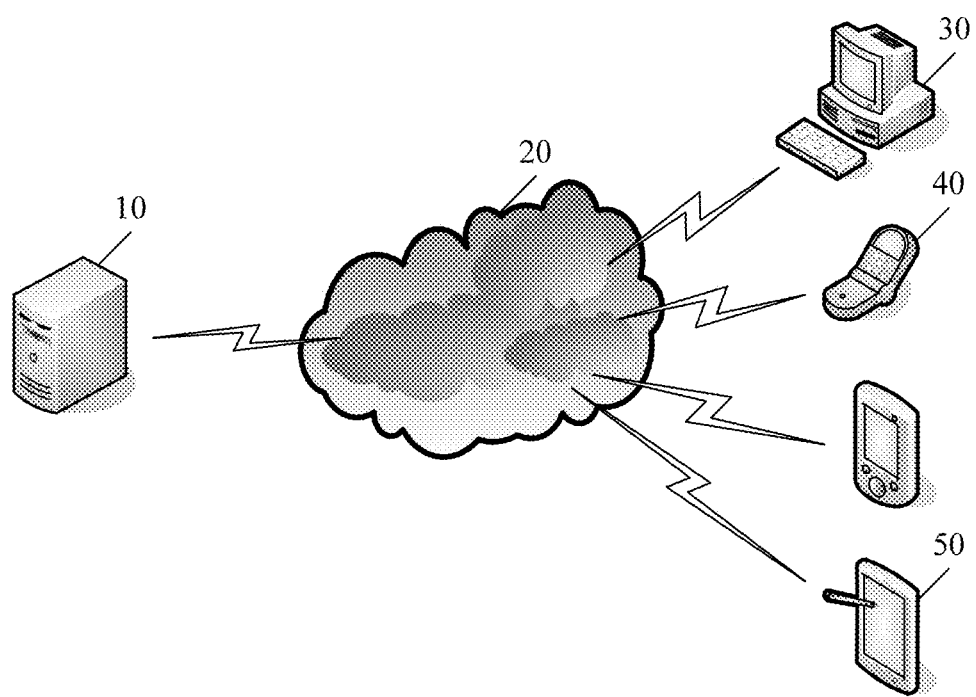
FIG. 1 is a schematic diagram of a network service platform according to an embodiment of the present invention.

FIG. 1 is a schematic diagram of a network service platform according to an embodiment. As shown in FIG. 1, the network service platform includes a server device 10, a communications network 20, and a user terminal device. The user terminal device may be a personal computer 30, a mobile phone 40, or a tablet computer 50; or may be another mobile Internet device (MID) of various types, for example an e-reader or a handheld game terminal that can be connected to the Internet by using various wireless communications technologies. The server device may be one or more servers, or a server cluster. The server device and the user terminal device can publish advertisement information to a user of the user terminal device by using a method for publishing advertisement information on a network service platform in an embodiment of the present invention.

Figure 2:
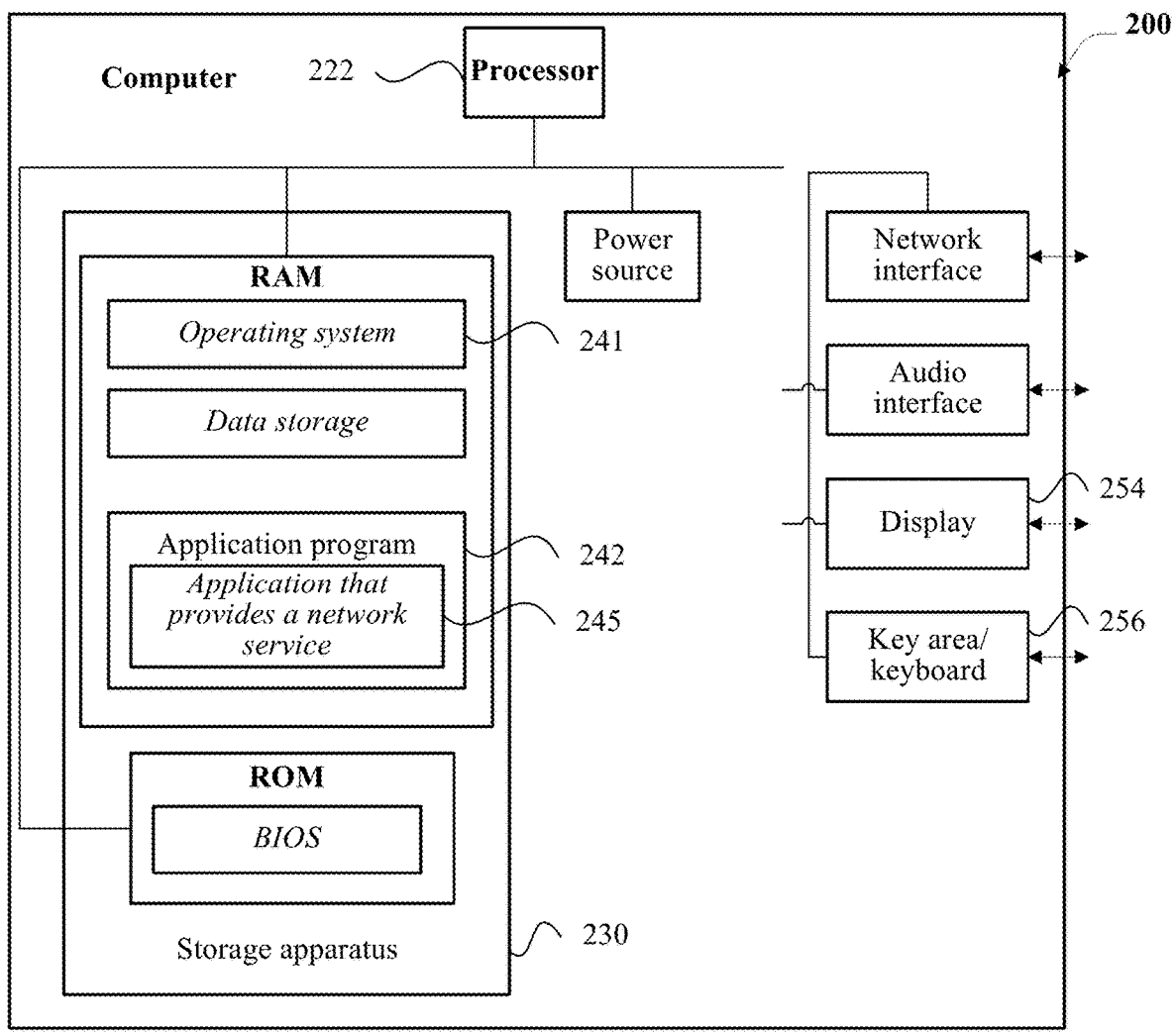
FIG. 2 is a schematic structural diagram of a computing device according to an embodiment of the present invention.

FIG. 2 is a schematic structural diagram of a computing device according to an embodiment. As shown in FIG. 2, the computing device 200 may be a computing device that can implement the method and software system that are provided in the embodiments of the present invention. For example, the computing device 200 may be a personal computer or a portable device such as a notebook computer, a tablet computer, a mobile phone, or a smartphone. The computing device 200 may further be a server connected to the foregoing devices by means of a network.

The computing device 200 may have different performances and characteristics. All possible implementation manners fall within the protection scope of this specification. For example, the computing device 200 may include a key area/keyboard 256, and may further include a display 254, for example a liquid crystal display (LCD) or a display with an advanced function such as a touch-sensitive 2D or 3D display. In an example, the computing device 200 with a web function may include one or more physical keyboards or virtual keyboards, and a mass storage apparatus 230.

The computing device 200 may also include or enable various operating systems 241, for example a Windows™ or Linux™ operating system, or mobile operating systems such as iOS™, Android™, and Windows Mobile™. The computing device 200 may include or run various application programs 242 such as an application 245 that provides a network service. The application program 242 can perform encrypted communication with another device by means of a network.

In addition, the computing device 200 may include one or more processor-readable non-volatile storage media 230 and one or more processors 222 that communicate with the storage medium 230. For example, the processor-readable non-volatile storage medium 230 may be a RAM, a flash memory, a ROM, an EPROM, an EEPROM, a register, a hard disk, a removable hard disk, a CD-ROM, or another non-volatile storage medium of various types. The storage medium 230 may store a series of instructions or units and/or modules that include instructions, used to complete operations in the embodiments of the present invention. The processor may execute the foregoing instructions to complete operations in the embodiments.

Figure 3:
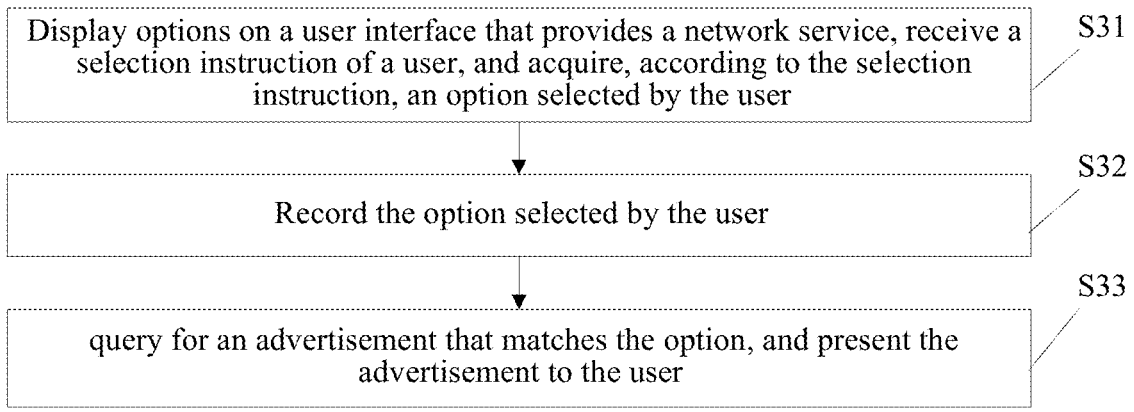
FIG. 3 is a flowchart of a method for publishing advertisement information on a network service platform according to an embodiment of the present invention.

FIG. 3 is a flowchart of a method for publishing advertisement information on a network service platform according to an embodiment of the present invention. The method may include the following steps:

Step S31: Display options on a user interface that provides a network service, receive a selection instruction of a user, and acquire, according to the selection instruction, an option selected by the user.

The option herein is also referred to as a to-be-followed option, and refers to a module that is provided to the user and is used by the user to select advertisement information that needs to be followed. There are generally multiple options, and different options may correspond to different product types, product names, or other key words.

Step S32: Record the option selected by the user.

Step S33: Query for an advertisement that matches the option, and present the advertisement to the user.

Figure 4:
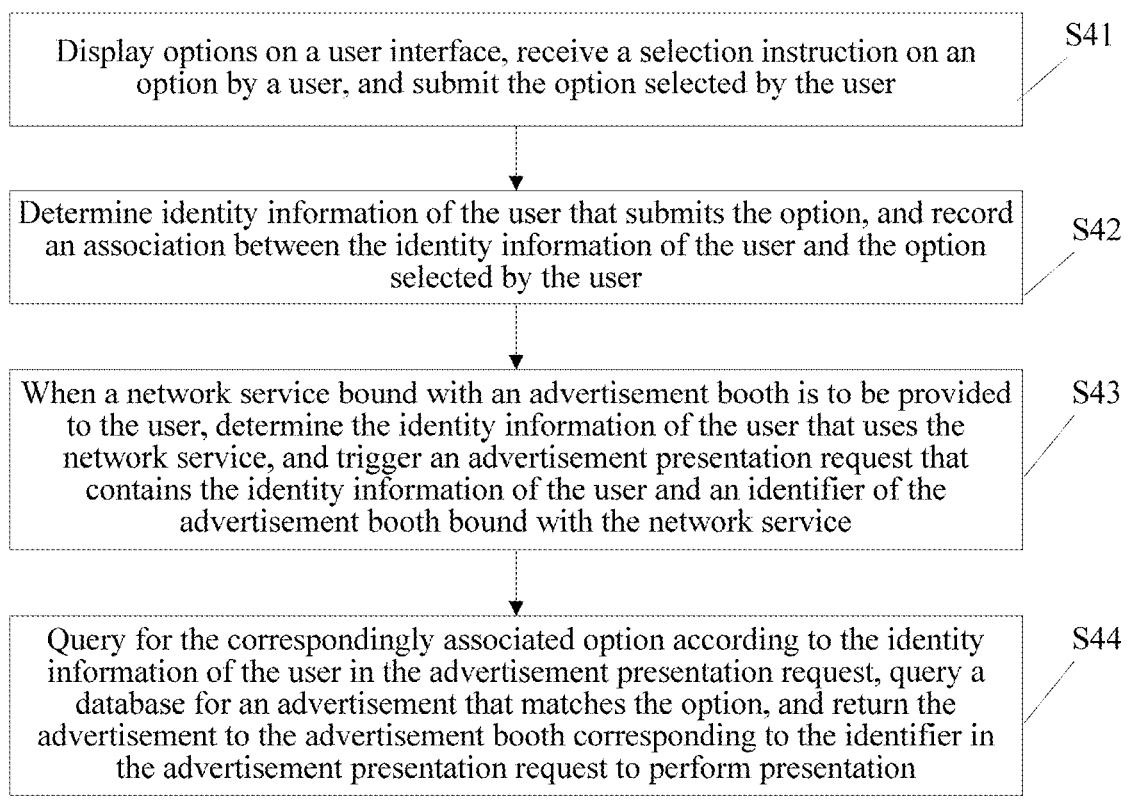
FIG. 4 is a flowchart of a method for publishing an advertisement on a network service platform according to an embodiment of the present invention.

FIG. 4 is a flowchart of a method for publishing advertisement information on a network service platform according to an embodiment of the present invention. The method may include the following steps:

Step S41: Display options on a user interface, receive a selection instruction of a user, and submit an option selected by the user.

Step S42: Determine identity information of the user that submits the option, and record an association between the identity information of the user and the option selected by the user.

Step S43: When a network service bound with an advertisement booth is to be provided to the user, determine the identity information of the user that uses the network service, and trigger an advertisement presentation request that contains the identity information of the user and an identifier of the advertisement booth bound with the network service.

Step S44: Query for the corresponding option according to the identity information of the user in the advertisement presentation request, find, from a database, an advertisement that matches the option, and return the advertisement to the advertisement booth corresponding to the identifier in the advertisement information presentation request to perform presentation.

Figure 5:
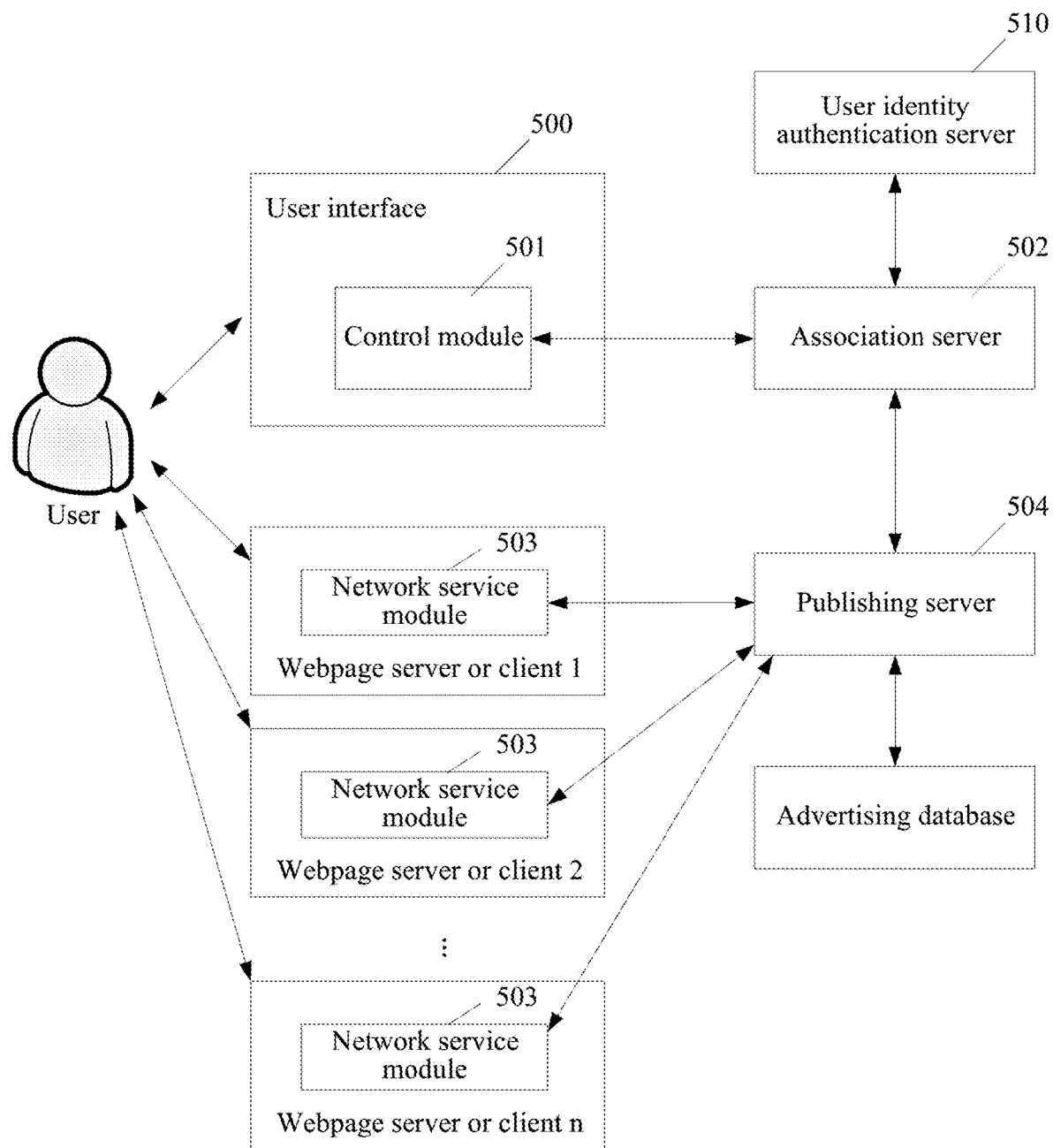
FIG. 5 is a schematic diagram of a system for publishing an advertisement on a network service platform according to an embodiment of the present invention.

Corresponding to the method of the present disclosure, the present disclosure further discloses a system for publishing an advertisement on a network service platform, configured to execute the method of the present disclosure. FIG. 5 is a schematic composition diagram of the system for publishing advertisement information on a network service platform according to the present disclosure. Referring to FIG. 5, the system for publishing advertisement information on a network service platform mainly includes: a control module 501, an association server 502, a network service module 503, and a publishing server 504.

The control module 501 is configured to display options on a user interface that provides a network service, receive a selection instruction of a user, and acquire, according to the selection instruction, an option selected by the user. In an embodiment, the control module 501 displays the options on a user interface 500, receives the selection instruction of the user, and submits the option selected by the user to the server.

The association server 502 is configured to record the option selected by the user. In an embodiment, the association server 502 may determine identity information of the user that submits the option, and record an association between the identity information of the user and the option selected by the user.

The network service module 503 is configured to query for an advertisement that matches the option, and present the advertisement to the user. According to an embodiment, when a network service bound with an advertisement booth is to be provided to the user, the network service module 503 determines the identity information of the user that uses the network service, and sends, to the publishing server 504, an advertisement presentation request that contains the identity information of the user and an identifier of the advertisement booth bound with the network service.

The publishing server 504 is configured to acquire the matching advertisement according to the query request of the network service module 503, and feed back the advertisement to the network service module 503. In an embodiment, the publishing server 504 queries the association server 502 for the corresponding option according to the identity information of the user in the advertisement presentation request sent by the network service module 503, queries a database for the advertisement that matches the option, and returns the advertisement to the network service module 503, so that the network service module 503 presents the advertisement in the advertisement booth corresponding to the identifier in the advertisement presentation request.

Figure 6A:
FIG. 6a is a schematic diagram of a thumbnail icon of a control module disposed on a webpage.
Figure 6B:
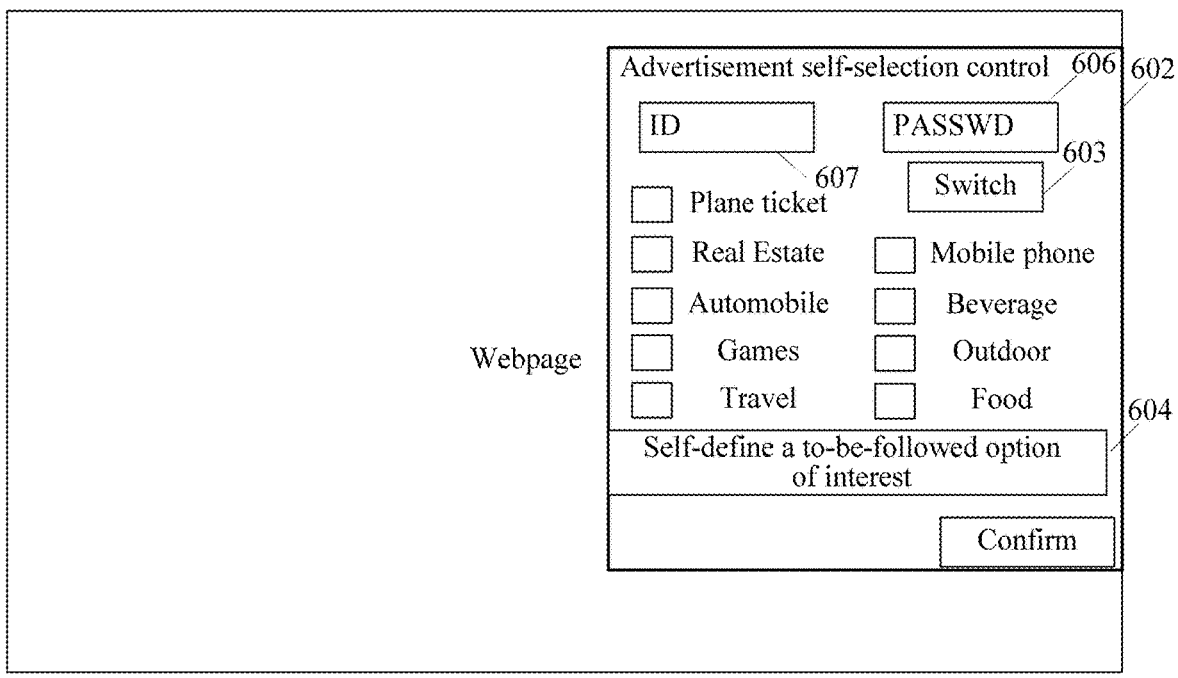
FIG. 6b is a schematic diagram of an option window of a control module disposed on a webpage.

The control module 501 may be disposed on the user interface 500 that provides a network service, and the user interface 500 may be, for example, a webpage interface, and may also be a client interface. FIG. 6a and FIG. 6b are schematic diagrams showing an embodiment in which the control module is disposed on a webpage. In this embodiment, a thumbnail icon of a control, that is, a thumbnail icon 601 shown in FIG. 6a, may be first displayed on the user interface 500, and the options are then displayed after a trigger instruction on the control by the user is received, for example, after a click instruction on the thumbnail icon 601 by the user is received, an option window 602 shown in FIG. 6b is presented, where more than two options such as "plane ticket", "real estate", "mobile phone", "automobile", and "travel" are included, and the user can select an option in which the user is interested. The options may be simultaneously selected, and the user may simultaneously select multiple options. If the current window has no option in which the user is interested, a "switch" button 603 may be clicked on to switch to other options. The user may further input self-defined text description content about a to-be-followed option of interest into a "self-define a to-be-followed option of interest" input box 604. After a "confirm" button is clicked on, selected and input content is submitted to the association server 502. After the user submits the content, the option window 602 is restored to the thumbnail icon 601 shown in FIG. 6a.

According to an embodiment of the present invention, an identifier (ID) of the user is extracted in a case in which the user currently already logs in to the current user interface 500, and the ID of the user is determined as the identity information of the user; or in a case in which the user currently does not log in to the current user interface 500, the user may be prompted to log in, and an ID of the user in login information is determined as the identity information of the user. Prompt information may be separately prompted, or may also be displayed together with the options on the same window shown in FIG. 6b. The prompt information may include an "ID" input box 605 used to input the ID of the user, and a "PASSWD" input box 606 used to input a password. After the user fills out the login information (the ID of the user and the password) and the option, the login information and the option may be submitted to the background association server 502 together. The association server 502 sends the ID of the user and the password to a user identity authentication server 510 corresponding to the user interface 500 to perform authentication. After the authentication succeeds, the association server 502 may determine the ID of the user in the login information as the identity information of the user, and save an association between the ID of the user and the option submitted by the user. A cookie is generated if the user does not input the login information or the input login information has not been authenticated, the cookie is used as the identity information of the user, and the cookie is saved in a client (for example, a browser) or a user terminal device used by the user.

According to an embodiment, a cookie may also be directly generated, the cookie is used as the identity information of the user, and the cookie is saved in a client used by the user.

After the identity information of the user is determined, the association server 502 records an association between the identity information of the user (for example, the ID of the user or the generated cookie) and the option selected by the user (for example, the option selected by the user in FIG. 6b), and the association record is stored in the association server. The association record is valid in all network services that are used by the user and can be logged in to in association with the user interface 500 on which the control module 501 is located, that is, other network services such as a webpage, an IM instant tool, a microblog, and a video that has a login association with the network service. A network service that has a login association with the network service refers to that after the user uses the ID of the user to log in to a first network service platform, a second network service platform is simultaneously logged in to, and the user can directly use the ID of the user to acquire a second network service without logging in again. If the identity information of the user in the association record is the ID of the user, the association record is also valid when the user switches a computer. If the identity information of the user in the association record is the cookie, the association record is valid when the user uses the user terminal device.

Figure 7:
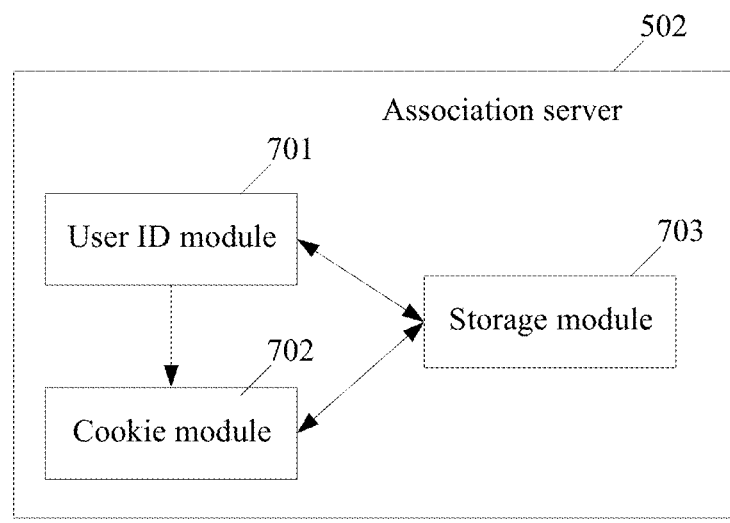
FIG. 7 is a schematic composition diagram of an association server 502 in a system for publishing an advertisement on a network service platform according to an embodiment of the present invention.

FIG. 7 is a schematic composition diagram of the association server 502 in the system for publishing an advertisement on an advertisement network service platform according to the present disclosure. The association server 502 includes a user ID module 701, a cookie module 702, and a storage module 703. As shown in FIG. 7, an ID of a user is preferably used to distinguish the identity of the user, and if the user does not log in, a cookie is used to distinguish the identity of the user. In an embodiment, the association server may include the cookie module 702 and the storage module 703, that is, a cookie is used to distinguish the identity of each user.

The user ID module 701 is specifically configured to extract the identifier ID of the user that submits the option in a case in which the user currently already logs in to a current user interface, and determine the ID of the user as the identity information of the user; or prompt, in a case in which the user currently does not log in to a current user interface, the user to log in, authenticate login information input by the user, and determine an ID of the user in the login information as the identity information of the user after the authentication succeeds; or if the user does not input the login information or the input login information has not been authenticated, trigger the cookie module.

The cookie module 702 is specifically configured to generate a cookie corresponding to the user, use the cookie as the identity information of the user, and further save the cookie in a client used by the user.

The storage module 703 is configured to store a record of an association between the identity information of the user and the option selected by the user.

In the present disclosure, the network service that is provided to the user and bound with the advertisement booth is a network service that is logged in to in association with the user interface 500 that displays the options, that is, by using a same ID of the user, the user can log in to the user interface 500 that displays the options, and can also log in to the network service bound with the advertisement booth. A quantity of network services is not limited, that is, in any network service that has a login association with the user interface 500 that displays the options, the solutions of the present disclosure can be used to publish an advertisement. A network service that has a login association with the network service refers to that after the user uses the ID of the user to log in to a first network service platform, a second network service platform is simultaneously logged in to, and the user can directly use the ID of the user to acquire a second network service without logging in again.

The network service may be provided in any manner, for example, the network service is provided by means of a webpage, or the service is provided by means of a client.

The network service provided by means of a webpage may include a portal site webpage provided to the user and a network service of various types provided in the form of a webpage, such as a microblog service, a webpage instant messaging service, or an audio-video communication service. The user may browse these webpages with a browser. Some webpages contain advertisement booths, and when the user browses the webpages, corresponding servers trigger advertisement presentation requests corresponding to the advertisement booths.

Some network services may be provided by, for example, providing various network service clients such as an instant messaging client, an audio-video communication client, a microblog client, a player client, and a reading client to the user. The user can acquire corresponding service content by means of a client. User interfaces of the clients may be bound with advertisement booths, and when the user uses the clients, advertisement presentation requests corresponding to the bound advertisement booths are triggered.

The network service module 503 may be disposed in a webpage server or client of a network service that can be logged in to in association with the user interface 500, which is shown in FIG. 5. In an embodiment, the network service module 503 may be disposed inside advertisement booth code; when the webpage server or client is to provide, to the user, a network service bound with an advertisement booth, the corresponding advertisement booth code is triggered for execution, and the network service module 503 in the advertisement booth code needs to determine identity information of a user that currently uses the network service.

In step S43, when a network service bound with an advertisement booth is to be provided to the user, for example, when the user browses a network forum interface bound with an advertisement booth, a manner of determining the identity information of the user that uses the network service may include: determining whether the user that uses the network service logs in to the network service; and if yes, extracting an ID of the user; and determining the ID of the user as the identity information of the user that uses the network service; or otherwise, querying for a local cookie, and determining a found cookie as the identity information of the user that uses the network service. In this case, the subsequently triggered advertisement presentation request contains the ID of the user or the cookie.

In an embodiment, a manner of determining the identity information of the user includes: determining whether the user logs in to the network service; and if yes, extracting an ID of the user; determining the ID of the user as the identity information of the user that uses the network service; querying for a local cookie; and also determining a found cookie as the identity information of the user that uses the network service; or otherwise, querying for a local cookie, and determining a found cookie as the identity information of the user that uses the network service. In this case, the subsequently triggered advertisement presentation request contains the ID of the user and the cookie. In this way, a large amount of user identity information is included, thereby expanding a range within which a matching advertisement is selected, and decreasing a failure rate at which an advertisement matches the user. In another embodiment, the advertisement request includes the cookie, and in this way, a login operation of the user can be avoided, and an operation of the user can be facilitated.

In an embodiment, a manner of determining the identity information of the user includes: directly querying for a local cookie, and determining a found cookie as the identity information of the user that uses the network service. In this way, a login operation of the user can be avoided. In an embodiment, during querying for a local cookie, more than two cookies may be found, and all the cookies may be used as the identity information of the user that uses the network service.

Corresponding to the method, in the system for publishing an advertisement on a network service platform, the network service module 503 includes a first identity determining module, or a second identity determining module, or a third identity determining module.

The first identity determining module is configured to determine whether the user that uses the network service logs in to the network service; if yes, extract an ID of the user; and determine the ID of the user as the identity information of the user that uses the network service; or otherwise, query for a local cookie, and determine a found cookie as the identity information of the user that uses the network service.

The second identity determining module is configured to determine whether the user that uses the network service logs in to the network service; and if yes, extract an ID of the user; determine the ID of the user as the identity information of the user that uses the network service; query for a local cookie; and also determine a found cookie as the identity information of the user that uses the network service; or otherwise, query for a local cookie, and determine a found cookie as the identity information of the user that uses the network service.

The third identity determining module is configured to query for a local cookie, and determine a found cookie as the identity information of the user that uses the network service.

In an embodiment, in step S44, a manner of querying for the associated option according to the identity information of the user in the advertisement presentation request may include:

if the identity information of the user in the advertisement presentation request is only an ID of the user, querying for an option correspondingly associated with the ID of the user;

if the identity information of the user in the advertisement presentation request is only a cookie, querying for an option correspondingly associated with the cookie; or if the identity information of the user in the advertisement presentation request is an ID of the user and a cookie, first querying for an option correspondingly associated with the ID of the user; and if the option is found, ending the query; or otherwise, then querying for an option correspondingly associated with the cookie. In this way, a range within which a matching advertisement is selected can be expanded, and a failure rate at which an advertisement matches the user can be decreased.

In an embodiment, if the identity information of the user in the advertisement presentation request includes more than two cookies, the querying for an option correspondingly associated with the cookie specifically includes: ranking the cookies in the advertisement presentation request according to preset domain name priorities, sequentially selecting a cookie in descending order of priorities, query for an option correspondingly associated with the cookie, and stopping selecting a next cookie when a correspondingly associated followed selection is found. In this way, a range within which a matching advertisement is selected can be further expanded, and a failure rate at which an advertisement matches the user can be further decreased.

Corresponding to the foregoing method, the publishing server 504 in the system for publishing advertisement information on an advertisement network service platform in the present disclosure may specifically include an option query module, configured to query the association server for an associated option according to identity information of the user in an advertisement presentation request. If the identity information of the user in the advertisement presentation request is only an ID of the user, an option correspondingly associated with the ID of the user is queried for; if the identity information of the user in the advertisement presentation request is only a cookie, an option correspondingly associated with the cookie is queried for; or if the identity information of the user in the advertisement presentation request is an ID of the user and a cookie, an option correspondingly associated with the ID of the user is first queried for; and if the option is found, the query ends; or otherwise, an option correspondingly associated with the cookie is then queried for.

In an embodiment, the option query module may be further configured to: if the identity information of the user in the advertisement presentation request includes more than two cookies, rank the cookies in the advertisement presentation request according to preset domain name priorities, sequentially select a cookie in descending order of priorities, query for an option correspondingly associated with the cookie, and stop selecting a next cookie when a correspondingly associated followed selection is found.

Figure 8:
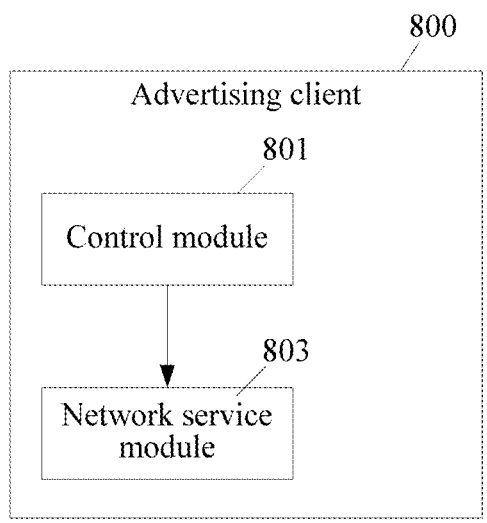
FIG. 8 is a schematic composition diagram of a client for publishing an advertisement on a network service platform according to an embodiment of the present invention.

Correspondingly, the control module 501 and the network service module 503 in the present disclosure may be further disposed in a dedicated client for publishing advertisement information on an advertisement network service platform, so that an integration level of the modules in the present disclosure is further improved, and a same client can be used by the user to complete option submission and corresponding advertisement presentation. FIG. 8 is a schematic composition diagram of a client for publishing advertisement information on an advertisement network service platform according to the present disclosure. Referring to FIG. 8, the client 800 for publishing advertisement information on an advertisement network service platform mainly includes: a control module 801 and a network service module 803.

The control module 801 is configured to display options on a user interface that provides a network service, receive a selection instruction of a user, acquire, according to the selection instruction, an option selected by the user, and submit the option to an association server for recording. In an embodiment, the control module 801 displays the options on the user interface, receives the selection instruction on the option by the user, and submits the option selected by the user. If the current user does not log in, the control module 801 further prompts the user to input login information (for example, an ID of the user and a password), and submits the login information and the selected option together to a corresponding association server.

The network service module 803 is configured to query a server for an advertisement that matches the option, and present the advertisement to the user. In an embodiment, when a network service bound with an advertisement booth is to be provided to the user, the network service module 803 determines the identity information of the user that uses the network service, sends, to the publishing server, an advertisement presentation request that contains the identity information of the user and an identifier of the advertisement booth bound with the network service, and presents the advertisement that is returned by the server and corresponds to the presentation request on the corresponding advertisement booth.

The client may be any client of the network service that is logged in to in association with the user interface that displays the options, and is, for example, an instant messaging client, an audio-video communication client, a microblog client, a player client, or a reading client. The network service module 803 can provide the specific network service.

By using the foregoing solution, the publishing server may find, from the association server, the option associated with the identity information of the user in the current advertisement presentation request, use the option as attribute information of the user, find, from an advertising database, the advertisement that matches the option, and send the advertisement to the advertisement booth corresponding to the identifier in the advertisement presentation request to present the advertisement to the user.

For example, assuming that a user A selects an option "mobile phone" in the control window 602 on the user interface 500, it indicates that the user A is interested in the field of mobile phones. As shown in FIG. 3, the association server 502 determines an ID of the user that is used by the user A to log in to the user interface 500 or generates a cookie, and records an association between the ID of the user or the cookie and the "mobile phone" option. When the user A uses any network service (for example, an instant messaging service, a microblog service, a forum service, a video service, a music service, or a reading service) logged in to in association with the user interface 500, for example, it is assumed herein that the user uses the video service, if the network service is bound with an advertisement booth (for example, the advertisement booth may be bound on a video interface, or the advertisement booth is bound on another page), the network service module 803 determines the login ID of the user and/or finds the cookie locally, and sends the login ID and/or the cookie and an identifier of the advertisement booth to the publishing server 504 by using an advertisement presentation request. The publishing server 504 queries the association server 502 to find the option, namely, "mobile phone", correspondingly associated with the login ID and/or the cookie, then uses the option as attribute information of the user, finds, from an advertising database, an advertisement that matches the option "mobile phone", and sends the advertisement to a server or a client (for example, a server or a client of the video service herein), which sends the advertisement presentation request, of the network service, so that the server or the client of the network service presents the advertisement on the corresponding advertisement booth.

As described above, in the whole processing process in the present disclosure, massive user Internet surfing records do not need to be used as a data basis, neither does resource-consumed data mining and computing need to be performed; therefore, a large number of computing resources and storage resources do not need to be occupied, less software and hardware devices are required, an implementation cost is low, and the processing efficiency is rather high. Moreover, because an option is actively selected by a user, information type followed by the user can be desirably reflected, and the information type matches the user to a great extent, thereby improving preciseness of matching between a finally published advertisement and the target user of the advertisement, and avoiding invasion of privacy information of the user.

It should be noted that not all steps and modules in the foregoing procedures and structural diagrams are mandatory, and some steps or modules may be neglected as actually needed. A sequence of executing the steps is not fixed, and may be adjusted as needed. Classification of the modules is merely for the purpose of conveniently describing classification of used functions. During actual implementation, one module may be implemented by multiple modules, and the functions of multiple modules may also be implemented by a same module; and the modules may be located in a same device, or may also be located in different devices. In addition, "first" and "second" described above are merely for the purpose of conveniently distinguishing two objects of a same meaning, and do not indicate an essential difference between the two objects.

The hardware modules in the embodiments may be implemented mechanically or electronically. For example, a hardware module may include a dedicatedly designed permanent circuit or logical device (for example, a dedicated processor such as an FPGA or an ASIC), configured to complete a specific operation. The hardware module may also include a programmable logical device or circuit (for example, a general-purpose processor or another programmable processor is included) temporarily configured by software, configured to perform a specific operation. Whether the hardware module is specifically implemented mechanically, or by a dedicated permanent circuit or a temporarily configured circuit (for example, configured by software) may be determined in consideration of cost and time.

The present disclosure further provides a machine readable storage medium to store an instruction for enabling a machine to execute the method described above. Specifically, a system or an apparatus equipped with a storage medium may be provided, the storage medium stores software program code for implementing the function of any one of the foregoing embodiments, and a computer (or a CPU or an MPU) of the system or apparatus is made to read and execute the program code stored in the storage medium. Moreover, an instruction that is based on program code may further be used to enable an operating system that operates on a computer or the like to complete a part or all of actual operations. The program code read from the storage medium may further be written into a memory disposed in an add-in board inserted into a computer, or written into a memory disposed in an expansion unit connected to the computer, and an instruction that is based on program code then enables a CPU or the like installed in the add-in board or expansion unit to perform a part or all of actual operations, thereby implementing the function of any one of the foregoing embodiments.

In an embodiment, the storage medium for providing the program code includes a floppy disk, a hard disk, a magneto-optical disk, an optical disk (for example, a CD-ROM, a CD-R, a CD-RW, a DVD-ROM, a DVD-RAM, a DVD-RW, or a DVD+RW), a magnetic disk, a non-volatile memory card, and a ROM. Optionally, the program code may be downloaded from a server computer by means of a communications network.

In conclusion, the scope of claims shall not be limited to the implementation manners in the examples described above, and this specification shall be regarded as a whole and interpreted in a broadest sense.

What is claimed is:

1. A method for publishing network media information on a network service platform, applied to a computing device, the method comprising:

displaying a first user interface prompting a user to provide login information to log in to a first network service, the displaying comprising simultaneously displaying a plurality of options, a user identifier (ID) input box configured to receive a first user input comprising a user ID of a user, a password input box configured to receive a password, and a confirm button configured to be pressed to log in the user to the first network service, wherein each option is associated with a respective one of a plurality of different advertising fields of interest, wherein each option displayed on the first user interface is configured to be selected or unselected by the user before submission of the user ID and the password to log in to the first network service, and wherein a pressing of the confirm button causes the user ID, the password, and an option of the plurality of options selected by the user to be submitted to at least one server to authenticate the user based on the user ID and the password in order to log in to the first network service, and associate the user ID with the option in response to the user being authenticated;

receiving the user ID, the password, and a selection instruction of the user in response to the user pressing the confirm button, the selection instruction indicating the option selected by the user;

recording the option selected by the user by determining identity information of the user based on the user ID, and recording an association between the identity information of the user and the option;

querying for network media information that matches the option based on the association between the identity information of the user and the option; and presenting the network media information on the first user interface providing the first network service and on a second user interface providing a second network service that has a login association with the first network service, wherein the second network service that has the login association with the first network service refers to the login association after the user uses the user ID to log in to a second network service platform to acquire the second network service, the user acquires the second network service using the user ID without logging in to a first network service platform for the first network service again.

2. The method according to claim 1, wherein the querying for network media information that matches the option comprises:

determining the identity information of the user, querying for the option corresponding to the identity information, and querying for the network media information that matches the option.

3. The method according to claim 2, wherein the querying for the network media information that matches the option, and presenting to the network media information comprises:
triggering, when the first network service to be provided to the user is bound with an advertisement booth, an advertisement presentation request that contains the identity information of the user and an identifier of the advertisement booth; and
querying for the option according to the identity information of the user in the advertisement presentation request, querying an advertising database for the network media information that matches the option, and returning the network media information to the advertisement booth corresponding to the identifier in the advertisement presentation request to perform presentation.

4. The method according to claim 1, further comprising:
generating a cookie, using the cookie as the identity information of the user, and saving the cookie in a user terminal device used by the user.

5. The method according to claim 3, wherein the advertisement presentation request comprises: the user ID of the user and/or a cookie, saved in a user terminal device used by the user, of the first network service.

6. The method according to claim 5, wherein the querying for the option according to the identity information of the user in the advertisement presentation request comprises:
querying for the option corresponding to the ID of the user in the advertisement presentation request; and/or
querying for the option corresponding to the cookie in the advertisement presentation request.

7. The method according to claim 6, wherein if the advertisement presentation request comprises more than two cookies, the querying for the option according to the identity information of the user in the advertisement presentation request comprises:
ranking the cookies in the advertisement presentation request according to preset domain name priorities, sequentially selecting a cookie in descending order of priorities, querying for an option correspondingly associated with the cookie, and stopping selecting a next cookie when a correspondingly associated followed selection is found.

8. A system for publishing network media information on a network service platform, the system comprising:
a control module, configured to:
display a first user interface prompting a user to provide login information to log in to a first network service, the display comprising a simultaneous display of a plurality of options, a user identifier (ID) input box configured to receive a first user input comprising a user ID of a user, a password input box configured to receive a password, and a confirm button configured to be pressed to log in the user to the first network service, wherein each option is associated with a respective one of a plurality of different advertising fields of interest, wherein each option displayed on the first user interface is configured to be selected or unselected by the user before submission of the user ID and the password to log in to the first network service, and wherein a pressing of the confirm button causes the user ID, the password, and an option of the plurality of options selected by the user to be submitted to at least one server to authenticate the user based on the user ID and the password in order to log in to the first network service, and associate the user ID with the option in response to the user being authenticated;
receive the user ID, the password, and a selection instruction of the user in response to the user pressing the confirm button, the selection instruction indicating the option selected by the user;
an association server, configured to:
record the option selected by the user by determining identity information of the user based on the user ID and recording an association between the identity information of the user and the option; and
a network service module, configured to:
query for network media information that matches the option based on the association between the identity information of the user and the option; and
present the network media information on the first user interface providing the first network service and on a second user interface providing a second network service that has a login association with the first network service,
wherein the second network service that has the login association with the first network service refers to the login association to log in the user.

9. The system according to claim 8, wherein:
the network service module is configured to, when the first network service to be provided to the user is bound with an advertisement booth, send, to a publishing server, an advertisement presentation request that contains the identity information of the user and an identifier of the advertisement booth; and
the publishing server is configured to query the association server for the option according to the identity information of the user in the advertisement presentation request, query an advertising database for the network media information that matches the option, and return the network media information to the advertisement booth corresponding to the identifier in the advertisement presentation request to perform presentation.

10. The system according to claim 8, wherein the association server comprises a cookie module; and
the cookie module is configured to generate a cookie corresponding to the user, use the cookie as the identity information of the user, and save the cookie in a user terminal device used by the user.

11. The system according to claim 9, wherein the publishing server comprises an option query module, configured to query the association server the option according to the identity information of the user in the advertisement presentation request, wherein:
if the identity information of the user in the advertisement presentation request is only the user ID of the user, an option correspondingly associated with the user ID of the user is queried for;
if the identity information of the user in the advertisement presentation request is only a cookie, an option correspondingly associated with the cookie is queried for;
if the identity information of the user in the advertisement presentation request is the user ID of the user and a cookie, an option correspondingly associated with the ID of the user is first queried for; and
if the option is found, the query ends, otherwise an option correspondingly associated with the cookie is then queried for.

12. The system according to claim 11, wherein the option query module is further configured to: if the identity information of the user in the advertisement presentation request comprises more than two cookies, rank the cookies in the advertisement presentation request according to preset domain name priorities, sequentially select a cookie in descending order of priorities, query for an option correspondingly associated with the cookie, and stop selecting a next cookie when a correspondingly associated followed selection is found.

13. A client for publishing network media information on a network service platform, the client comprising:
  a control module, configured to:
    display a first user interface prompting a user to provide login information to log in to a first network service, the display comprising a simultaneous display of a plurality of options, a user identifier (ID) input box configured to receive a first user input comprising a user ID of a user, a password input box configured to receive a password, and a confirm button configured to be pressed to log in the user to the first network service, wherein each option is associated with a respective one of a plurality of different advertising fields of interest, wherein each option displayed on the first user interface is configured to be selected or unselected by the user before submission of the user ID and the password to log in to the first network service, and wherein a pressing of the confirm button causes the user ID, the password, and an option of the plurality of options selected by the user to be submitted to at least one server to authenticate the user based on the user ID and the password in order to log in to the first network service, and associate the user ID with the option in response to the user being authenticated;
    receive the user ID, the password, and a selection instruction of the user in response to the user pressing the confirm button, the selection instruction indicating the option selected by the user; and
    submit the option to an association server for recording of an association between the identity information of the user and the option; and
  a network service module, configured to:
  query a server for network media information that matches the option, and present the network media information on the first user interface providing the first network service and on a second user interface providing a second network service that has a login association with the first network service,
  wherein the second network service that has the login association with the first network service refers to the login association to log in the user.

* * * * *